July 23, 1940. F. B. WENDEL 2,209,181
METHOD OF COUPLING TUBES
Filed Sept. 22, 1937
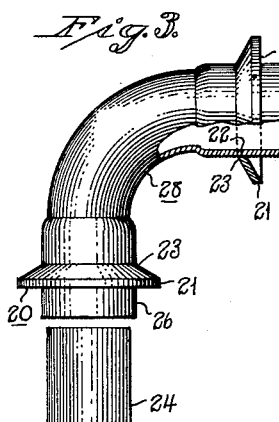
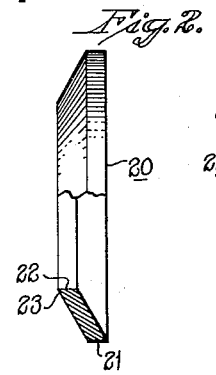
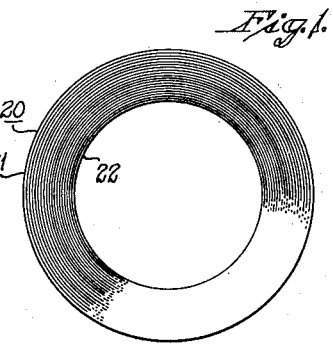
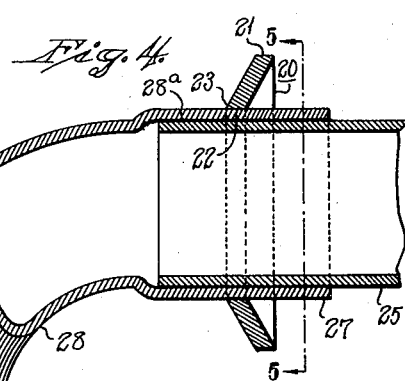
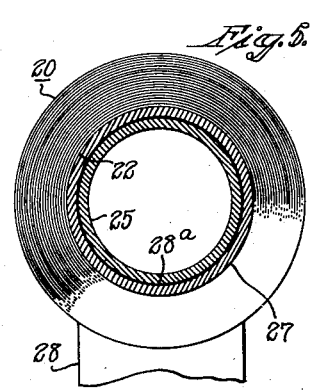
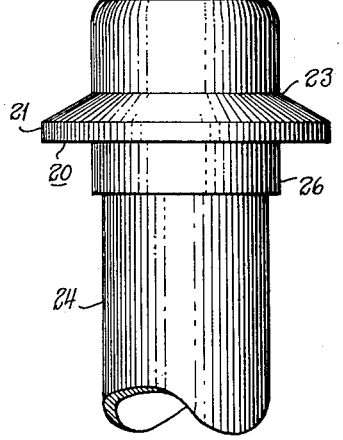
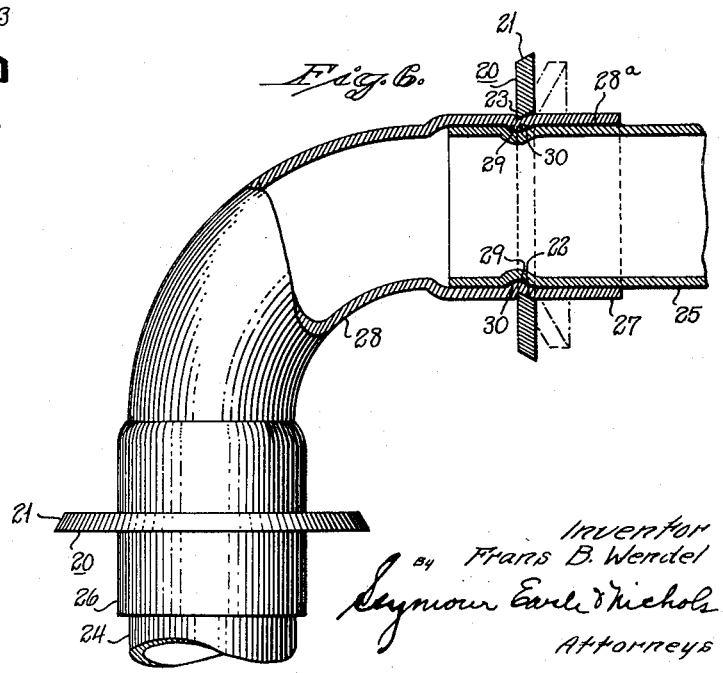
Inventor
Frans B. Wendel
by Seymour Earle & Nichols
Attorneys Patented July 23, 1940

2,209,181

UNITED STATES PATENT OFFICE 2,209,181

METHOD OF COUPLING TUBES

Frans B. Wendel, Waterbury, Conn., assignor to Chase Brass & Copper Co., Incorporated, Waterbury, Conn., a corporation of Connecticut Application September 22, 1937, Serial No. 165,114

1 Claim. (Cl. 29—88.2)

This invention relates to methods and devices for coupling tubular members together against axial separation.

One of the main objects of the present invention is to provide a superior method and device whereby telescopically-related tubular members of ductile material, such for instance as copper tubes, elbows, tees, etc., may be firmly united in a simple, reliable and effective manner.

The present invention is especially well suited for mechanically interlocking tubular members of the so-called "sweated" telescope-joint type wherein solder or the like is employed for insuring a fluid-tight joint between the adjacent surfaces of the telescopically-interfitted tubular members. Such joints, however, are apt to pull apart when subjected to a degree of heat sufficiently high to melt or weaken the solder or other fusible material employed to effect the fluid-tight joint above referred to. Ordinary sweated joints are apt to be ineffective when employed for instance in an installation which is apt to be subjected to excessive heat, such for instance as in a so-called "dry-sprinkler" system wherein the pipe system is ordinarily free of water, which water is only turned into the piping system when a fire occurs and after the system has become heated by the flames.

With the above and other objects in view, as will appear to those skilled in the art from the present disclosure, this invention includes all features in the said disclosure which are novel over the prior art.

In the accompanying drawing, in which certain modes of carrying out the present invention are shown for illustrative purposes:

Fig. 1 is a face view of one of the conically-contoured or dished sustaining-rings;

Fig. 2 is a view thereof partly in edge elevation and partly in central section;

Fig. 3 is a view partly in side elevation and partly in central longitudinal section showing a wrought-metal elbow and two wrought-metal tubes positioned to be telescopically interfitted with the respective opposite terminals of the said elbow;

Fig. 4 is a view partly in side elevation and partly in central longitudinal section showing the parts completely assembled preparatory to being interlocked;

Fig. 5 is a transverse sectional view taken on the line 5—5 of Fig. 4; and

Fig. 6 is a view corresponding to Fig. 4 but showing the sustaining-rings as having been straightened out to interlock the adjacent telescoped tubular members and to sustain such interlocking.

In the embodiment of the present invention chosen for illustration, a sustaining-ring generally designated by the reference character 20 is employed. The said sustaining-ring may be formed of any suitable material such, for instance, as stainless steel, high-strength bronze, etc., and as shown is of conically-contoured form and will, for convenience of description, be referred to as a "dished" sustaining-ring, since in its initial form prior to reshaping in situ as will hereinafter appear, the said ring is characterized by its dished character. The said dished sustaining-ring 20 is preferably initially formed with an outer edge 21 and an inner edge 22, both of which extend parallel with the axis of the ring. As thus shaped and as shown particularly well in Figs. 1 to 5 inclusive, the sustaining-ring includes an acute-angled heel-portion 23 which, as will hereinafter appear, will later be pressed into the adjacent metal of the telescoped parts to be interlocked by the operation of straightening out the sustaining-ring so as to deprive it of sufficient or all of its dished character.

If it is desired to interlock two tubes or pipes of copper or other ductile material 24 and 25 to the respective opposite bell-mouthed terminals 26 and 27 of a wrought-metal elbow generally designated by the reference character 28, a dished sustaining-ring such as 20 is first slipped over each of the said terminals 26 and 27 as illustrated in Fig. 3 of the accompanying drawing. The ends of the respective tubes 24 and 25 would now be telescopically slipped within the terminals 26 and 27 respectively of the elbow 28 and the parts would now be in the positions in which they are shown in Fig. 4. Where conditions of pressure or the like make it desirable, the telescoped parts may be soldered together as indicated by the relatively-thick line 28a in Figs. 4, 5 and 6, by treating the surfaces with a suitable flux before telescoping the same and then heating the parts and applying solder at the outer edge of the terminals 26 and 27 for flowage inwardly by capillary action.

The next step after the parts have been assembled as shown in Figs. 4 and 5 above referred to, is to straighten out or remove some or all of the dished characteristics of the sustaining-ring 20. This result may be effected in any convenient manner, as for instance by means of a hammer and anvil, to straighten out the sustaining-ring 20 either wholly or partially, so as to cause the heel-portion 23 of each of the said rings to press inwardly into the adjacent portion of the metal of the terminals 26 and 27 of the elbow 28 so as to form an internal annular interlocking-bead or -projection 29 in each of the said terminals which in turn will press inwardly upon the outer surface of the ends of each of the tubes 24 and 25 and form an annular interlocking-grove or -depression 30 in each thereof.

By simultaneously forming an internal interlocking-projection such as 29 upon the interior of the outer tubular member and a mating interlocking-depression in the inner tubular member and having the sustaining-ring remain in position to sustain the interlock thus produced, a very rugged structure is produced, whether or not solder is also employed as before referred to.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claim are intended to be embraced therein.

I claim:

A method of forming a fluid-tight joint between the telescopically-interfitted terminals of tubular-members constructed of ductile non-ferrous metal, comprising: jointly encircling the telescopically-interfitted inner and outer terminals of the said tubular-members with a dished sustaining-ring constructed of higher strength metal than the said non-ferrous metal and having an angular heel-portion and a cylindrical inner periphery forming one surface of said angular heel-portion and conforming in size and shape to the cylindrical outer surface of the outer terminal; and axially flattening the said dished sustaining-ring to cause said angular heel-portion to be angularly and inwardly displaced to effect a joint inward displacement of corresponding circumferential wall-portions of the telescopically-interfitted terminals of both tubular members.

FRANS B. WENDEL.